United States Patent
Hovardas et al.

(10) Patent No.: US 11,408,624 B2
(45) Date of Patent: Aug. 9, 2022

(54) REFRIGERANT LEAK DETECTION

(71) Applicant: Carrier Corporation, Palm Beach Gardens, FL (US)

(72) Inventors: Sotiri T. Hovardas, Indianapolis, IN (US); Larry D. Burns, Avon, IN (US); Mark E. Hemphill, Avon, IN (US)

(73) Assignee: Carrier Corporation, Palm Beach Gardens, FL (US)

( * ) Notice: Subject to any disclaimer, the term of this patent is extended or adjusted under 35 U.S.C. 154(b) by 25 days.

(21) Appl. No.: 16/948,621

(22) Filed: Sep. 25, 2020

(65) Prior Publication Data

US 2021/0108820 A1    Apr. 15, 2021

Related U.S. Application Data

(60) Provisional application No. 62/915,295, filed on Oct. 15, 2019.

(51) Int. Cl.
| | |
|---|---|
| *F24F 11/36* | (2018.01) |
| *F24F 11/77* | (2018.01) |
| *G01N 21/61* | (2006.01) |
| *F24F 110/65* | (2018.01) |

(52) U.S. Cl.
CPC .............. *F24F 11/36* (2018.01); *F24F 11/77* (2018.01); *G01N 21/61* (2013.01); *F24F 2110/65* (2018.01)

(58) Field of Classification Search
CPC ......... F24F 11/36; F24F 11/77; F24F 2110/65
See application file for complete search history.

(56) References Cited

U.S. PATENT DOCUMENTS

| | | | | |
|---|---|---|---|---|
| 11,125,457 | B1* | 9/2021 | Alfano | F24F 11/52 |
| 2011/0118896 | A1* | 5/2011 | Holloway | F24F 11/30 |
| | | | | 700/300 |
| 2016/0178229 | A1* | 6/2016 | Chen | F24F 11/30 |
| | | | | 62/56 |
| 2018/0094844 | A1* | 4/2018 | Suzuki | F25B 13/00 |
| 2018/0313591 | A1* | 11/2018 | Obara | F24F 13/20 |
| 2018/0327179 | A1* | 11/2018 | Papas | F25D 11/003 |
| 2019/0024931 | A1* | 1/2019 | Suzuki | F24F 11/65 |

(Continued)

FOREIGN PATENT DOCUMENTS

| | | | |
|---|---|---|---|
| CN | 105823170 A | * | 8/2016 |
| JP | 2006010697 A | | 1/2006 |

(Continued)

*Primary Examiner* — Nelson J Nieves
(74) *Attorney, Agent, or Firm* — James A. Edwards

(57) ABSTRACT

A refrigerant detection assembly for detecting moderate-to-low GWP value refrigerants, an air conditioning system for incorporating the same, and a method of detecting refrigerant leaks using the refrigerant detection assembly are provided. The refrigerant detection assembly may be disposed proximate to an indoor heat exchanger. The refrigerant detection assembly includes a nondispersive infrared (NDIR) sensor, a fan disposed adjacent to the nondispersive infrared sensor, the fan configured to direct a sample to the nondispersive infrared sensor, and a controller operatively connected to the nondispersive infrared sensor and the fan. The controller is configured to operate the fan in constant operation and trigger a response when the refrigerant detection assembly detects at least 25% lower flammability limit (LWL) in the sample.

14 Claims, 3 Drawing Sheets

(56) References Cited

U.S. PATENT DOCUMENTS

| 2019/0072291 | A1* | 3/2019 | Kamijo | F25B 49/005 |
| 2019/0145945 | A1 | 5/2019 | Gautieri | |
| 2019/0346165 | A1* | 11/2019 | Obara | F24F 1/0068 |
| 2020/0271343 | A1* | 8/2020 | Crawford | F24F 3/001 |

FOREIGN PATENT DOCUMENTS

| JP | 2016176648 A | * | 10/2016 |
| WO | 2018187450 A1 | | 10/2018 |
| WO | 2018209082 A1 | | 11/2018 |
| WO | 2018215069 A1 | | 11/2018 |

* cited by examiner

REFRIGERANT LEAK DETECTION

CROSS REFERENCE TO A RELATED APPLICATION

The application claims the benefit of U.S. Provisional Application No. 62/915,295 filed Oct. 15, 2019, the contents of which are hereby incorporated in their entirety.

BACKGROUND

The subject matter disclosed herein relates to detecting leaks of moderate-to-low global warming potential (GWP) value refrigerants. More particularly, the subject matter disclosed herein relates to a refrigerant detection assembly for detecting moderate-to-low GWP value refrigerants, an air conditioning system for incorporating the same, and a method of detecting refrigerant leaks using the refrigerant detection assembly.

Air conditioning systems for residential or commercial buildings typically include an outdoor unit and an indoor unit. The indoor unit contains an indoor heat exchanger, which adsorbs heat from the air being passed through the system using a refrigerant when the system is operating in cooling mode. The outdoor unit contains an outdoor heat exchanger, which cools and condenses the gaseous refrigerant when the system is operating in cooling mode. This refrigerant, historically, has been provided as a fluid with a high GWP value such as R134A or R410A. Although these refrigerants are effective coolants, the effect they can have on the environment has led to the institution of requirements that new refrigerants, which have moderate-to-low GWP values, be employed instead.

Moderate-to-low GWP refrigerants (i.e. A2L refrigerants) can be mildly flammable, however, and thus their use in air conditioning systems can present risks that needs to be addressed. In particular, to the extent that refrigerant leaks are possible in air conditioning systems, it is desirable to have leak detection systems in place when A2L refrigerants are in use for indoor units for ducted residential heating, ventilation and air conditioning (HVAC) products and other similar systems.

One of the existing technologies available to detect refrigeration leaks is a nondispersive infrared sensor (NDIR). However, a current limitation of using a NDIR sensor is the high response time in comparison with other technologies. Such response time is critical to ensure effective safety measures. Accordingly, there remains a need to for a refrigeration detection assembly with an acceptable response time to detect leaks of A2L refrigerant.

BRIEF DESCRIPTION

According to one embodiment, an air conditioning system is provided, which includes a refrigerant detection assembly disposed proximate to an indoor heat exchanger. The refrigerant detection assembly includes a nondispersive infrared (NDIR) sensor, a fan disposed adjacent to the nondispersive infrared sensor, the fan configured to direct a sample to the nondispersive infrared sensor, and a controller operatively connected to the nondispersive infrared sensor and the fan. The controller is configured to operate the fan in constant operation and trigger a response when the refrigerant detection assembly detects at least 25% lower flammability limit (LFL) in the sample.

In accordance with additional or alternative embodiments, the nondispersive infrared sensor is configured to detect at least one A2L refrigerant.

In accordance with additional or alternative embodiments, the response is triggered within ten seconds of the sample reaching 100% lower flammability limit.

In accordance with additional or alternative embodiments, the response includes at least one of: an alarm signal, stopping operation of the system, opening a zoning damper, and operating an indoor fan.

In accordance with additional or alternative embodiments, the refrigerant detection assembly is attached to the indoor heat exchanger.

According to another aspect of the disclosure, a refrigerant detection assembly is provided, which includes a nondispersive infrared (NDIR) sensor, a fan configured to direct a sample to the nondispersive infrared sensor, and a controller operatively connected to the fan. The controller is configured to operate the fan in constant operation and trigger a response when the sensor detects at least 25% lower flammability limit in the sample.

In accordance with additional or alternative embodiments, the at least 25% lower flammability limit in the sample is reached by a leak of at least one A2L refrigerant.

In accordance with additional or alternative embodiments, the response is triggered within ten seconds of the sample reaching 100% lower flammability limit.

In accordance with additional or alternative embodiments, the response includes at least one of: an alarm signal, stopping operation of the system, operating a zoning damper, and operating an indoor fan of an air conditioning system.

According to another aspect of the disclosure, a method for detecting a refrigerant leak is provided. The method provides for the operating of a nondispersive infrared sensor, directing of a sample to the nondispersive infrared sensor continuously with a fan, and triggering a response with a controller when the sensor detects at least 25% lower flammability in the sample. The refrigerant detection assembly includes a nondispersive infrared (NDIR) sensor, a fan disposed adjacent to the nondispersive infrared sensor, and a controller operatively connected to the fan.

In accordance with additional or alternative embodiments, the controller is operatively connected to the fan to operate the fan continuously.

In accordance with additional or alternative embodiments, the at least 25% lower flammability limit in the sample is reached by a leak of at least one A2L refrigerant.

In accordance with additional or alternative embodiments, the response is triggered within ten seconds of the sample reaching 100% lower flammability limit.

In accordance with additional or alternative embodiments, the response includes at least one of: an alarm signal, stopping operation of the system, opening a zoning damper, and operating an indoor fan of an air conditioning system

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
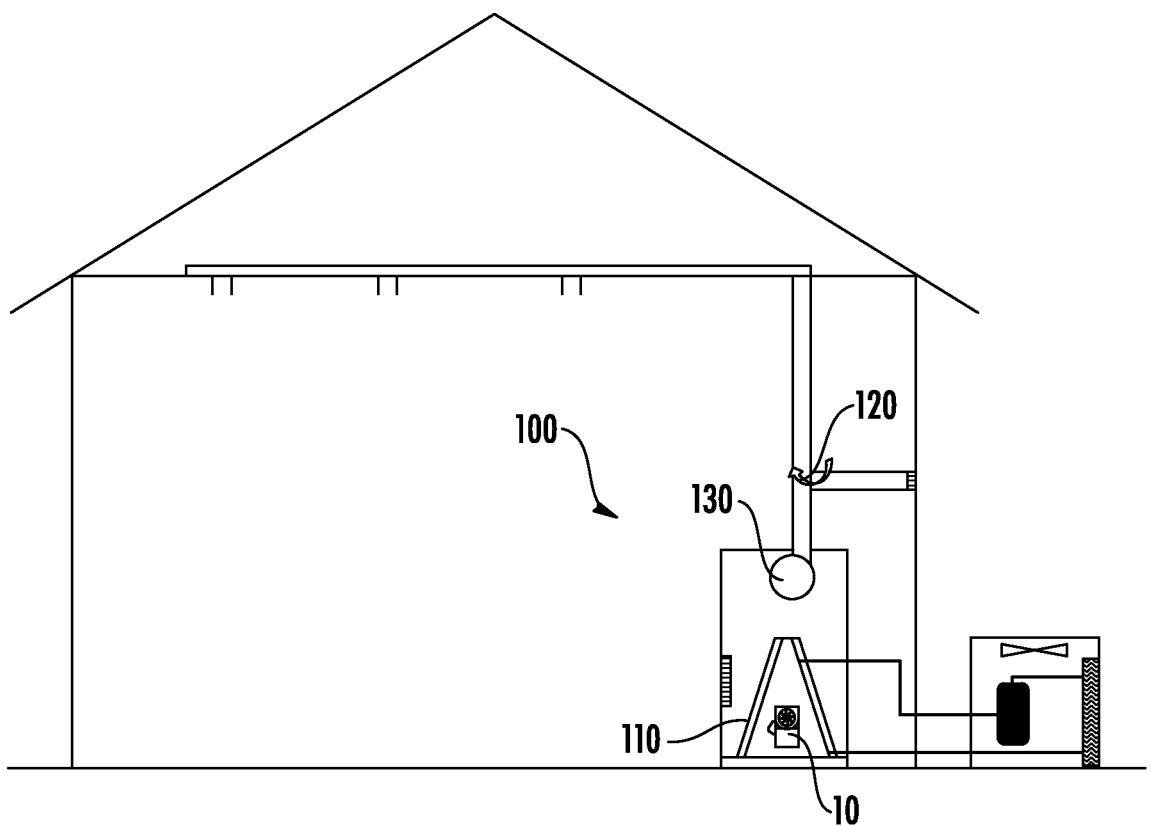
FIG. 1 is a schematic illustration of an air conditioning system in accordance with one aspect of the disclosure.

As will be described below, a refrigerant detection assembly, an air conditioning system for incorporating the same, and a method of detecting refrigerant leaks using the refrigerant detection assembly are provided. The refrigerant detection assembly enables the detection of leaks within ten seconds of being exposed to 100% lower flammability limit (LFL). The refrigerant detection assembly utilizes a nondispersive infrared (NDIR) sensor. The refrigerant detection assembly overcomes the high response time traditionally associated with nondispersive infrared sensors by incorporating a fan to force a sample into the NDIR sensor. This sample will contain an air and refrigerant mixture when there is a leak in the air conditioning system. By forcing the sample into the NDIR sensor, the fan effectively reduces the amount of time it takes for the refrigerant to diffuse into the NDIR sensor thereby reducing the response time of detecting a leak. For example, the refrigerant detection assembly may be capable of detecting a leak of at least one A2L refrigerant.

The classification of refrigerant is based upon American Society of Heating, Refrigerating and Air-Conditioning (ASHRAE) Standard 34. The standard evaluates each refrigerant's flammability and toxicity and gives it a class referenced as a letter and number combination. The letter refers to the refrigerants toxicity, and is based on the particular refrigerant's occupational exposure limit (OEL). An "A" is given to refrigerants with a 400 ppm or greater OEL. A "B" is given to refrigerants with less than 400 ppm OEL. The number adjacent to the letter refers to the refrigerants flammability, and is based on the burning velocity (BV), heat of combustion (HOC), and lower flammability limits (LFL) of the particular refrigerant. A flammability of "1" is the lowest, with a "3" being the highest. Recently the second class was broken into "2L" and "2". A rating of "2L" indicates that while the refrigerant is still considered flammable, its flammability is much lower than that of class 2 or 3. It is envisioned that the refrigerant detection assembly described herein may be capable of detecting a leak and triggering a response of at least one A2L refrigerant when the NDIR sensor detects at least 25% LFL in the sample.

A lower flammability limit (LFL) of a refrigerant is the minimum concentration limit that is required for the refrigerant to become potentially combustible. For example, R-32, which is an A2L refrigerant, has a LFL of 13.3%. A 25% LFL value is one quarter of the value of the LFL. For example, R-32 has a 25% LFL value of 3.3%. For illustrative purposes, if the R-32 were used as the refrigerant in the air conditioning system, the refrigerant detection assembly may be configured to trigger a response when the NDIR sensor detects at least 3.3% of R-32 in the sample. In certain instances, the refrigerant detection assembly may make it possible to trigger a response within ten seconds of the sample reaching 100% LFL. For example, if using R-32 as the refrigerant, the refrigerant detection assembly may make it possible to trigger a response within ten seconds of the sample containing 13.3% R-32.

Figure 2:
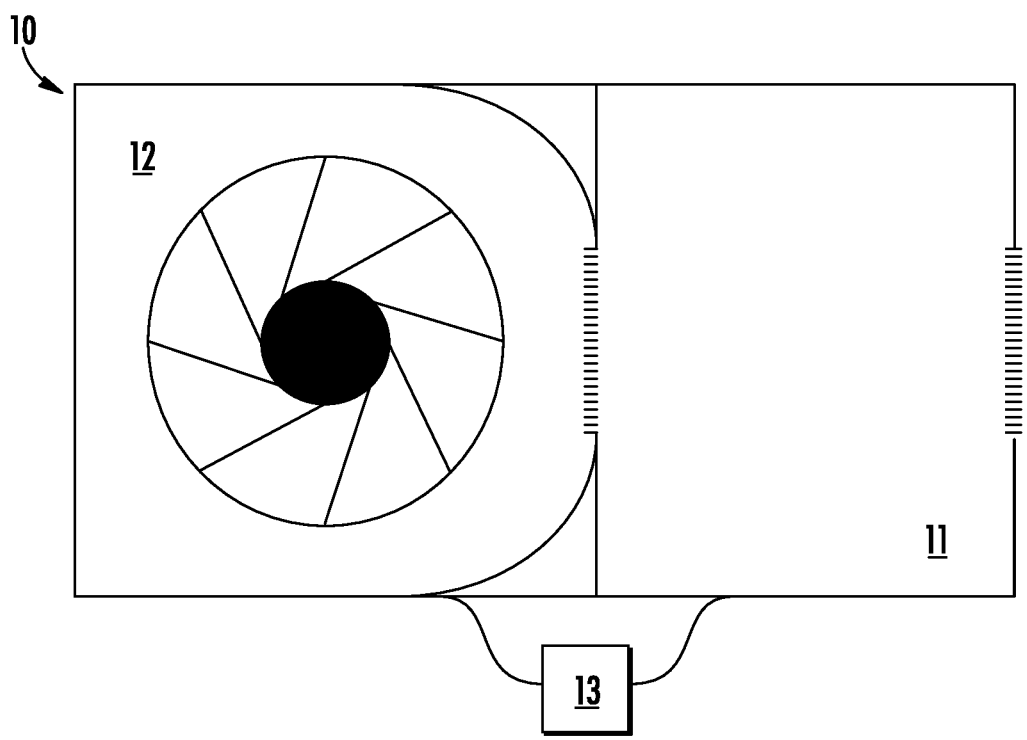
FIG. 2 is a perspective view of a refrigerant detection assembly in accordance with one aspect of the disclosure.

With reference now to the Figures, an air conditioning system 100 is schematically shown in FIG. 1, which incorporates the refrigerant detection assembly 10 of FIG. 2. As shown in FIG. 1, the air conditioning system 100 includes a refrigerant detection assembly 10 located proximate to the indoor heat exchanger 110. The air conditioning system 100 is provided for use within a building, such as a residential or commercial building, and may be configured as a ductless or ducted system. For purposes of clarity and brevity, however, the following description will relate to the exemplary use of the air conditioning system 100 as a ducted system.

In certain instances, the air conditioning system 100 includes an indoor unit and an outdoor unit, the indoor unit containing an indoor heat exchanger 110 and the outdoor unit containing an outdoor heat exchanger. When operating in cooling mode, the indoor heat exchanger 110 adsorbs heat from the air being passed through the air conditioning system 100. The cooled air is then circulated into the building by way of the air ducts. The outdoor unit, in addition to including an outdoor heat exchanger, also includes a fan and a compressor. When operating in cooling mode, the outdoor heat exchanger, in combination with the fan, operates to adsorb heat from the refrigerant being passed through the outdoor unit. The compressor in the outdoor unit pumps the refrigerant in a cyclical manner through the air conditioning system 100. This refrigerant may, in rare instances, leak into the air conditioning system 100. When utilizing A2L refrigerants in the air conditioning system 100, a leak of refrigerant could lead to undesirable consequences due to the mildly flammable nature of A2L refrigerants. To identify leaks in the air conditioning system 100, the air conditioning system provides a refrigerant detection assembly 10 located proximate to the indoor heat exchanger 110. In certain instances, the refrigerant detection assembly 10 is attached to the indoor heat exchanger 110. For example, the refrigerant detection assembly 10 may be attached to the sheet metal of the coils delta plate of the indoor heat exchanger 110.

An exemplary embodiment of the refrigerant detection assembly 10 is shown in FIG. 2. As shown in FIG. 2, the refrigerant detection assembly 10 includes a nondispersive infrared sensor 11, a fan 12 disposed adjacent to the nondispersive infrared sensor 11, the fan 12 configured to direct a sample to the nondispersive infrared sensor 11, a controller 13 operatively connected to the nondispersive infrared sensor 11 and the fan 12. The controller 13 is configured to operate the fan 12 in constant operation and trigger a response when the refrigerant detection assembly 10 detects at least 25% lower flammability limit (LFL) in the sample. In certain instances, the controller 13 of the refrigerant detection assembly 10 is configured to trigger a response within ten seconds of the sample reaching 100% lower flammability limit.

In instances where the refrigerant detection assembly 10 detects a leak (ex. when the refrigerant detection assembly 10 detects at least 25% LFL in the sample) in the air conditioning system 100, the response triggered by the controller 13 may include at least one of: an alarm signal, stopping operation of the air conditioning system 100, operating a zoning damper 120, and operating an indoor fan 130 of the air conditioning system 100. For example, the controller 13 may encourage the dilution of refrigerant in the building or air conditioning system 100 by directing the air from the air conditioning system 100 outside the building. In certain instances, the controller operates both the zoning damper 120 and the indoor fan 130 of the air conditioning system to direct the air from the air conditioning system 100 outside the building. By utilizing a zoning damper 120, the air conditioning system 100 is capable of redirecting air outside the building when potentially hazardous conditions are present. In certain instances, the stopping operation of the air conditioning system 100 triggered by the controller 13 includes at least shutting off of the compressor in the outdoor unit to discontinue the circulation of refrigerant between the outdoor unit and the indoor unit.

To ensure that the air conditioning system 100 is effectively monitored for leaks, the fan 12 of the refrigerant detection assembly 10 is operated in a continuous manner by the controller 13. The continuous operation of the fan 12 should not be interpreted as operating for a brief period of time in order to establish a calibration (ex. calibration of the NDIR sensor), but instead should be interpreted as the uninterrupted running of the fan 12 by the controller 13 to constantly direct a sample toward the NDIR sensor 11. By running in a continuous manner, the refrigerant detection assembly 10 enables a reduced response time for detecting a leak in the air conditioning system 100 than what otherwise would be possible without the use of a fan 12. In certain instances, the refrigerant detection assembly 10 triggers a response when the NDIR sensor 11 detects at least a 25% LFL in the sample. This 25% LFL in the sample may be reached by a leak of at least one A2L refrigerant. The configuration and method in which the refrigerant detection assembly 10 is used reduces the response time for detecting a refrigerant leak such that effective safety measures can be initiated.

Figure 3:
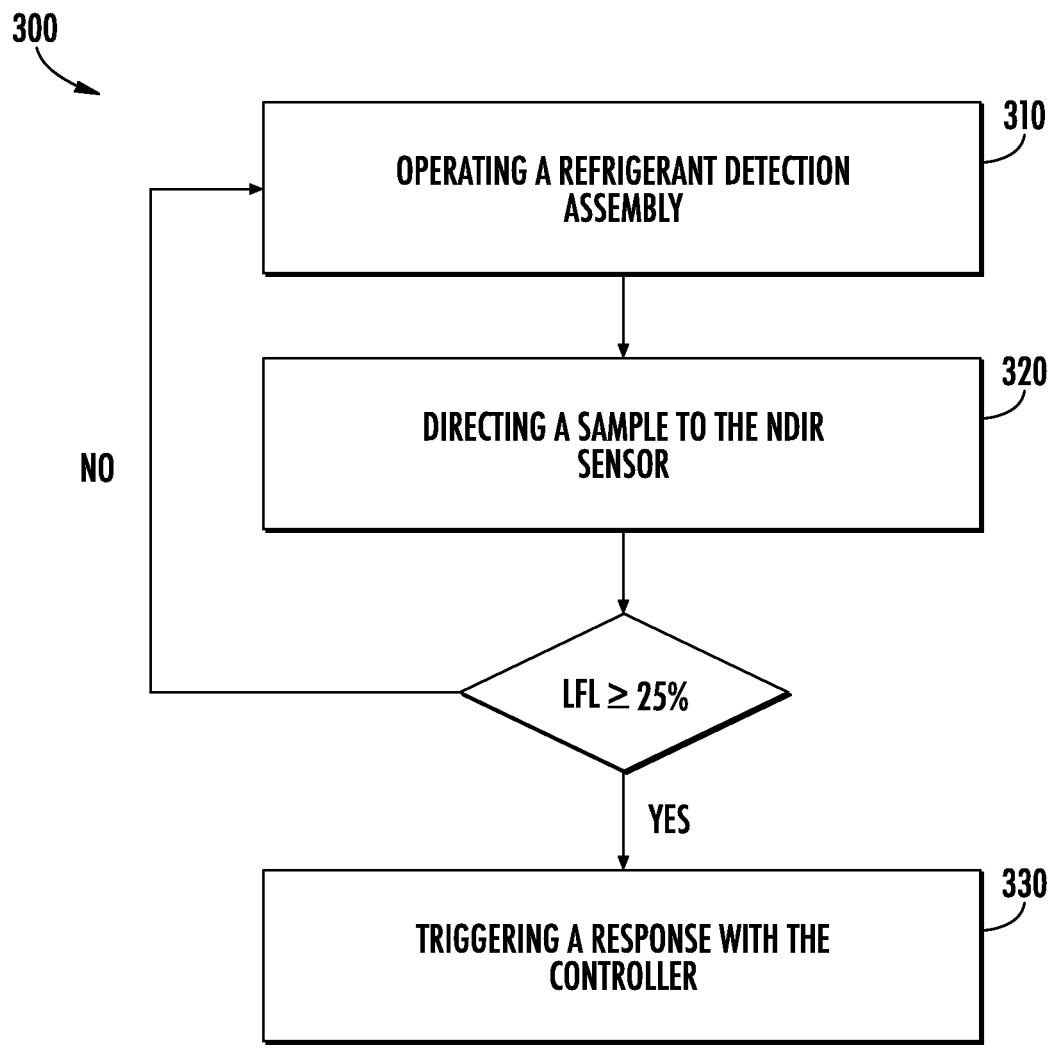
FIG. 3 is a flow diagram illustrating a method of detecting a refrigerant leak in accordance with one aspect of the disclosure.

The method of detecting a refrigerant leak using the refrigerant detection assembly 10 is illustrated in FIG. 3. As shown in FIG. 3, the method 300 includes step 310 of operating a refrigerant detection assembly 10, the refrigerant detection assembly 10 including a nondispersive infrared sensor 11, a fan 12 disposed adjacent to the nondispersive infrared sensor 11, and a controller 13 operatively connected to the fan 12. The method 300 further includes step 320 of directing a sample to the nondispersive infrared sensor 11 continuously with the fan 12. To ensure that the fan 12 is operated continuously, in certain instances, the controller 13 is operatively connected to the fan. The method 300 further includes step 330 for triggering a response with the controller 13 when the sensor 11 detects at least 25% lower flammability limit in the sample. The 25% LFL in the sample may be reached by a leak of at least one A2L refrigerant. In certain instances, the response is triggered within ten seconds of the sample reaching 100% LFL. When the sensor 11 detects at least 25% LFL in the sample, the response triggered by the controller 13 may include at least one of: an alarm signal, stopping operation of the air conditioning system 100, operating a zoning damper 120, and operating an indoor fan 130 of the air conditioning system 100. The response may make it possible to mitigate the potentially hazardous conditions.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air conditioning system, comprising:
   an indoor heat exchanger;
   a refrigerant detection assembly located proximate to the indoor heat exchanger, the refrigerant detection assembly comprising:
   a nondispersive infrared sensor for sensing a flammable refrigerant;
   a fan disposed adjacent to the nondispersive infrared sensor, the fan configured to continuously direct a sample to the nondispersive infrared sensor; and
   a controller operatively connected to the nondispersive infrared sensor and the fan, the controller configured to:
   operate the fan in constant operation; and
   trigger a response when the refrigerant detection assembly detects a concentration of at least 25% of the lower flammability limit in the sample.

2. The air conditioning system of claim 1, wherein the nondispersive infrared sensor is configured to detect at least one A2L refrigerant.

3. The air conditioning system of claim 1, wherein the response is triggered within ten seconds of the sample reaching 100% of the lower flammability limit.

4. The air conditioning system of claim 1, wherein the response comprises at least one of: an alarm signal, stopping operation of the system, opening a zoning damper, and operating an indoor fan.

5. The air conditioning system of claim 1, wherein the refrigerant detection assembly is attached to the indoor heat exchanger.

6. A refrigerant detection assembly, comprising:
   a nondispersive infrared sensor for sensing a flammable refrigerant;
   a fan configured to continuously direct a sample to the nondispersive infrared sensor; and
   a controller operatively connected to the nondispersive infrared sensor and the fan, the controller configured to:
   operate the fan in constant operation, and
   trigger a response when the sensor detects a concentration of at least 25% of the lower flammability limit in the sample.

7. The refrigerant detection assembly of claim 6, wherein the at least 25% of the lower flammability limit in the sample is reached by a leak of at least one A2L refrigerant.

8. The refrigerant detection assembly of claim 6, wherein the response is triggered within ten seconds of the sample reaching 100% of the lower flammability limit.

9. The refrigerant detection assembly of claim 6, wherein the response comprises at least one of: an alarm signal, stopping operation of the system, opening a zoning damper, and operating an indoor fan of an air conditioning system.

10. A method for detecting a refrigerant leak, the method comprising:
    operating a refrigerant detection assembly, the refrigerant detection assembly including a nondispersive infrared sensor for sensing a flammable refrigerant, a fan disposed adjacent to the nondispersive infrared sensor, and a controller operatively connected to the nondispersive infrared sensor and the fan;
    directing a sample to the nondispersive infrared sensor continuously with the fan; and
    triggering a response with the controller when the sensor detects a concentration of at least 25% of the lower flammability in the sample.

11. The method of claim 10, wherein the controller is operatively connected to the fan to operate the fan continuously.

12. The method of claim 10, wherein the at least 25% of the lower flammability limit in the sample is reached by a leak of at least one A2L refrigerant.

13. The method of claim 10, wherein the response is triggered within ten seconds of the sample reaching 100% of the lower flammability limit.

14. The method of claim 10, wherein the response comprises at least one of: an alarm signal, stopping operation of the system, opening a zoning damper, and operating an indoor fan of an air conditioning system.

* * * * *